Patented Aug. 9, 1927.

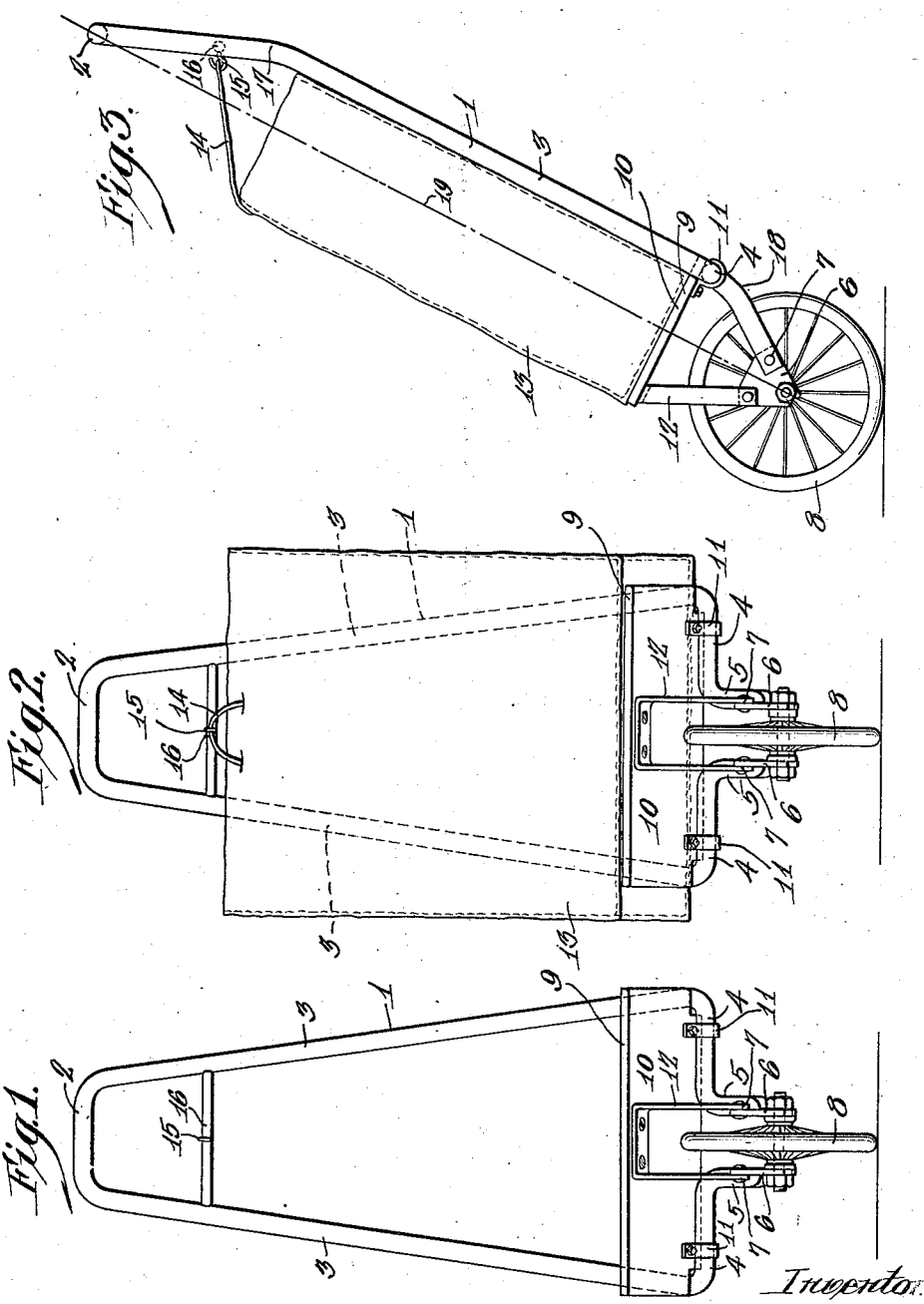

1,638,794

UNITED STATES PATENT OFFICE.

ALINE L. ALDRICH, OF MERION STATION, PENNSYLVANIA.

PORTABLE CARRIER.

Application filed February 6, 1926. Serial No. 86,467.

This invention relates to portable carriers, especially adapted for use in carrying large and heavy packages.

A shopper, especially the housewife, doing the weekly shopping of groceries, meats, etc., generally purchases a large number of items which make up heavy and bulky packages. These packages being heavy and unhandy to carry soon tire the person carrying them. A small wagon sometimes used for carrying these packages, is unsatisfactory because it cannot be used by a person boarding a street car to reach the shopping district.

The objects of my invention are to provide a portable carrier of light and compact construction which may be carried on the arm when boarding a street car; which may be easily manipulated when loaded with large and heavy packages, and which may be lifted bodily and carried on the arm with packages thereon.

These objects, and other advantageous ends which will be described hereinafter, I attain in the following manner, reference being had to the accompanying drawings in which Figure 1 is a front view of a carrier made in accordance with my invention showing it in an inclined position, Figure 2 a like view showing a bag which may be used with the carrier, and Figure 3 a side view of Figure 2.

Referring to the drawings, 1 indicates the frame of a yoke-shape having a horizontal handle part 2; 3 indicates arms diverging from the handle part and bent inwardly at 4 and forwardly and downwardly at 5. A bearing plate 6 is secured to the end of each arm at 7 so that a ground-engaging wheel 8 may be rotatably secured to the plates. A package support 9 is secured to the frame and is preferably in the form of a platform 10 extending forwardly from the arms adjacent the wheel. The platform is secured to the arms by clips 11 and to the plates by a brace 12. A bag 13, of any suitable type, is preferably used with the platform for supporting packages. The bag is provided with a looped handle 14 which takes over a hook 15 secured to a cross piece 16 fixed between arms 3 of the frame. The frame when viewed from Figure 3 is preferably bent at 17 and at 18, to bring handle 2 and the center of the wheel in a plane 19. This gives a neat and symmetrical outline to the carrier and when loaded with packages may be easily balanced.

In use the carrier when empty, may be wheeled on the ground by gripping the horizontal handle part 2 with one hand, or it may be carried by passing the handle part over the arm of the person. When wheeling a package on the platform, it is preferable to use bag 13 so that the carrier and the package may be lifted and carried bodily as when boarding street cars. When wheeling the loaded carrier it may be easily balanced with one hand by holding the horizontal handle part 2.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A carrier including a yoke-shaped frame having a handle part and carrier arms diverging from the handle part; a ground-engaging wheel, the ends of said arms being bent for attachment to the wheel; means attaching the ends of the arms to the wheel, a package support secured to the arms, said carrier arms being adapted to support a load on a plane situated below the axis passing through said handle, the center of said package support and the center of said wheels at a distance from said axis equal to half the height of said support above the arms.

2. A carrier including a yoke-shaped frame having a handle part; arms diverging from the handle part, a ground-engaging wheel, and means securing the wheel to the ends of the arms, said arms being spaced from each other at the handle part by the length of the handle equal to X, the space between the arms gradually increasing until it reaches the distance Y, whereupon the arms incline toward each other until separated by a distance Z approximately equal to the width of said wheel, a line through the center of said wheel and handle being equidistant from said arms in a plane above them; and a package support secured to said arms at the point of widest separation.

3. A carrier including a yoke-shaped frame having a handle part; arms extending from the handle part and having their ends bent inwardly and forwardly; plates secured to the ends of the arms; a wheel rotatably secured to the plates; a platform; a brace secured to the plates and the platform, and means for attaching the platform to the arms.

In testimony whereof I have signed my name to this specification.

ALINE L. ALDRICH.